United States Patent
Collart et al.

(10) Patent No.: US 11,194,112 B2
(45) Date of Patent: Dec. 7, 2021

(54) CABLE FIXATION DEVICES AND METHODS

(71) Applicant: COMMSCOPE CONNECTIVITY BELGIUM BVBA, Kessel-Lo (BE)

(72) Inventors: Stephane Collart, Turnhout (BE); Eric Schurmans, Geetbets (BE); David Jan Irma Van Baelen, Winksele (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 764 days.

(21) Appl. No.: 16/067,521

(22) PCT Filed: Dec. 29, 2016

(86) PCT No.: PCT/EP2016/082899
§ 371 (c)(1),
(2) Date: Jun. 29, 2018

(87) PCT Pub. No.: WO2017/114936
PCT Pub. Date: Jul. 6, 2017

(65) Prior Publication Data
US 2021/0208356 A1    Jul. 8, 2021

Related U.S. Application Data

(60) Provisional application No. 62/273,867, filed on Dec. 31, 2015.

(51) Int. Cl.
*G02B 6/44* (2006.01)

(52) U.S. Cl.
CPC .................................. *G02B 6/4471* (2013.01)

(58) Field of Classification Search
None
See application file for complete search history.

(56) References Cited

U.S. PATENT DOCUMENTS

5,700,156 A * 12/1997 Bussard ............ H01R 13/5804
439/471
6,528,728 B1 * 3/2003 Shima .................. H02G 3/0437
174/101

(Continued)

FOREIGN PATENT DOCUMENTS

WO    2014/173930 A1    10/2014
WO    2015/091865 A2    6/2015

OTHER PUBLICATIONS

International Search Report and Written Opinion of the International Searching Authority for International Patent Application No. PCT/EP2016/082899 dated Mar. 21, 2017, 13 pages.

*Primary Examiner* — Rhonda S Peace
(74) *Attorney, Agent, or Firm* — Merchant & Gould P.C.

(57) ABSTRACT

A cable fixation device (10) includes a base (110), an upright (114) projecting from the base and including a fixation projection (116) having a reduced dimensional portion (118) for receiving a cable tie (124). Ribs (126) are provided for engaging the cable jacket or a wrap around the cable. The base (110) and the fixation projections (116) can be made from molded plastic. The fixation projections (116) can be staggered on the cable fixation device (10). The cable fixation device (10) can be mounted with a snap arrangement (38) to an enclosure (12) with one or more additional cable fixation devices (10).

13 Claims, 18 Drawing Sheets

(56) References Cited

U.S. PATENT DOCUMENTS

| | | | |
|---|---|---|---|
| 7,345,241 B2* | 3/2008 | Caveney | H01R 9/2416 |
| | | | 174/135 |
| 8,165,442 B2* | 4/2012 | Burek | G02B 6/4471 |
| | | | 385/134 |
| 8,285,104 B2* | 10/2012 | Davis | G02B 6/4471 |
| | | | 385/135 |
| 8,620,128 B2* | 12/2013 | Holmberg | G02B 6/4471 |
| | | | 385/135 |
| 8,747,145 B2* | 6/2014 | Gossen | H01R 13/5812 |
| | | | 439/460 |
| 9,291,791 B2* | 3/2016 | Sievers | G02B 6/4471 |
| 9,678,298 B2* | 6/2017 | Kimbrell | G02B 6/4471 |
| 9,971,120 B2* | 5/2018 | Rudenick | G02B 6/4471 |
| 9,983,377 B2* | 5/2018 | Dellinger | G02B 6/4471 |
| 10,186,851 B2* | 1/2019 | Peterson | H02G 3/32 |
| 10,268,010 B2* | 4/2019 | Pasek | G02B 6/4444 |
| 2002/0039476 A1 | 4/2002 | Sauve et al. | |
| 2006/0108481 A1* | 5/2006 | Riedy | F16L 3/223 |
| | | | 248/68.1 |
| 2006/0219848 A1* | 10/2006 | Komiya | F16G 13/16 |
| | | | 248/49 |
| 2006/0237212 A1* | 10/2006 | Komiya | F16G 13/16 |
| | | | 174/74 R |
| 2008/0247710 A1 | 10/2008 | Oike et al. | |
| 2008/0299824 A1* | 12/2008 | Legg | H01R 13/6395 |
| | | | 439/595 |

* cited by examiner

CABLE FIXATION DEVICES AND METHODS

CROSS-REFERENCE TO RELATED APPLICATION

This application claims the benefit of U.S. Patent Application Ser. No. 62/273,867, filed on Dec. 31, 2015, the disclosure of which is incorporated herein by reference in its entirety.

BACKGROUND

Telecommunications systems such as fiber optic communications systems are becoming prevalent in part because service providers want to delivery high band width communication capabilities to customers. Fiber optic communications systems employ a network of fiber optic cables to transmit large volumes of data and voice signals over relatively long distances. Being part of a large fiber optic network, cables routed to and from telecommunications equipment may be exposed to pulling, pushing or rotational forces. It is desirable to provide effective cable fixation or termination for fiber optic cables that are secured or anchored to telecommunications equipment or fixtures to limit damage to optical fibers within the cables and/or connections within the telecommunications equipment.

SUMMARY

One aspect of the present invention relates to a cable fixation device including a base mountable to telecommunications equipment and including at least one upright projecting from the base. The upright includes a fixation projection having a reduced dimensional portion for receiving a cable tie to hold a cable.

In one implementation, the base, the upright, and the fixation projection are made from plastic.

In one implementation, the base includes one or more snaps for mounting to a holder.

In one implementation, the base includes projecting feet for supporting the base on a holder.

In one implementation, the base includes a lower projection for receipt in a corresponding opening on a holder.

In one implementation, the cable fixation device includes at least two fixation projections. In some implementations, the fixation projections are staggered relative to an opposite side from the direction of extension of the fixation projections. In some implementations, the fixation projections are positioned adjacent to cut-outs in the upright. In some implementations, the one or more fixation projections are positioned to extend from the opposite side in a direction parallel to the base.

In one implementation, the cable fixation device includes at least three fixation projections.

In one implementation, the cable fixation device includes at least four fixation projections.

In one implementation, the cable fixation device includes at least five fixation projections.

In one implementation, the cable fixation device includes more than five fixation projections.

In one implementation, the reduced dimensional portion includes ribs for engaging a cable jacket.

In one implementation, the fixation projection can hold at least two cables. In one implementation, there is a cable on each of two opposite sides of the fixation projection.

In one implementation, the cable fixation device snaps to a base plate mountable to telecommunications equipment. In one implementation, the cable fixation device snaps to an edge of the base plate.

According to one example embodiment, the cable fixation device of the present disclosure may be used to fix cables to a variety of different telecommunications equipment. The telecommunications equipment, including fiber optic equipment, to which telecommunications cables are fixed using the cable fixation device of the present disclosure, may also be referred to as equipment, a fixture, or an enclosure.

In one implementation, the enclosure includes a base member, a cover, and an interior for receiving telecommunications cables, connections, splices, splitters, and/or other equipment.

Cables enter the enclosure through one or more cable ports. Not all of cable ports need be used in every application. Cable seals can be are used to seal the individual cables entering at each cable port from the environment, such as from dust or water. The cable fixation devices in one example are used to fix distribution cables. The distribution cables can be fixed to the cable fixation devices before the cable fixation devices are mounted to a base plate with snaps or after.

DETAILED DESCRIPTION

The present disclosure relates to arrangements and methods for providing effective fixation of telecommunications cables to telecommunications equipment.

According to one example embodiment, the telecommunications equipment discussed herein are fiber optic equipment and the telecommunications cables discussed herein are fiber optic cables that define an outer jacket and at least one optical fiber therein. In some implementations, the fiber optic cables include a strength member or members. In some implementations, the fiber optic cable may include multiple optical fibers.

It should be noted that a fiber optic cable is simply one example of a telecommunications cable that may be used to describe the inventive features of the cable fixation device of the present disclosure and other types of cables, including electrical cables and hybrid cables that may be terminated with the devices discussed herein.

According to one example embodiment, the fixation device of the present disclosure may be referred to as a cable fixation device 10. The cable fixation device 10 of the present disclosure may be used to fix cables to a variety of different telecommunications equipment. The telecommunications equipment, including fiber optic equipment, to which telecommunications cables are fixed using the cable fixation device 10 of the present disclosure, may also be referred to as equipment, fixture, or enclosure 12. As used herein, the example shown is for an enclosure 12.

Figure 1:
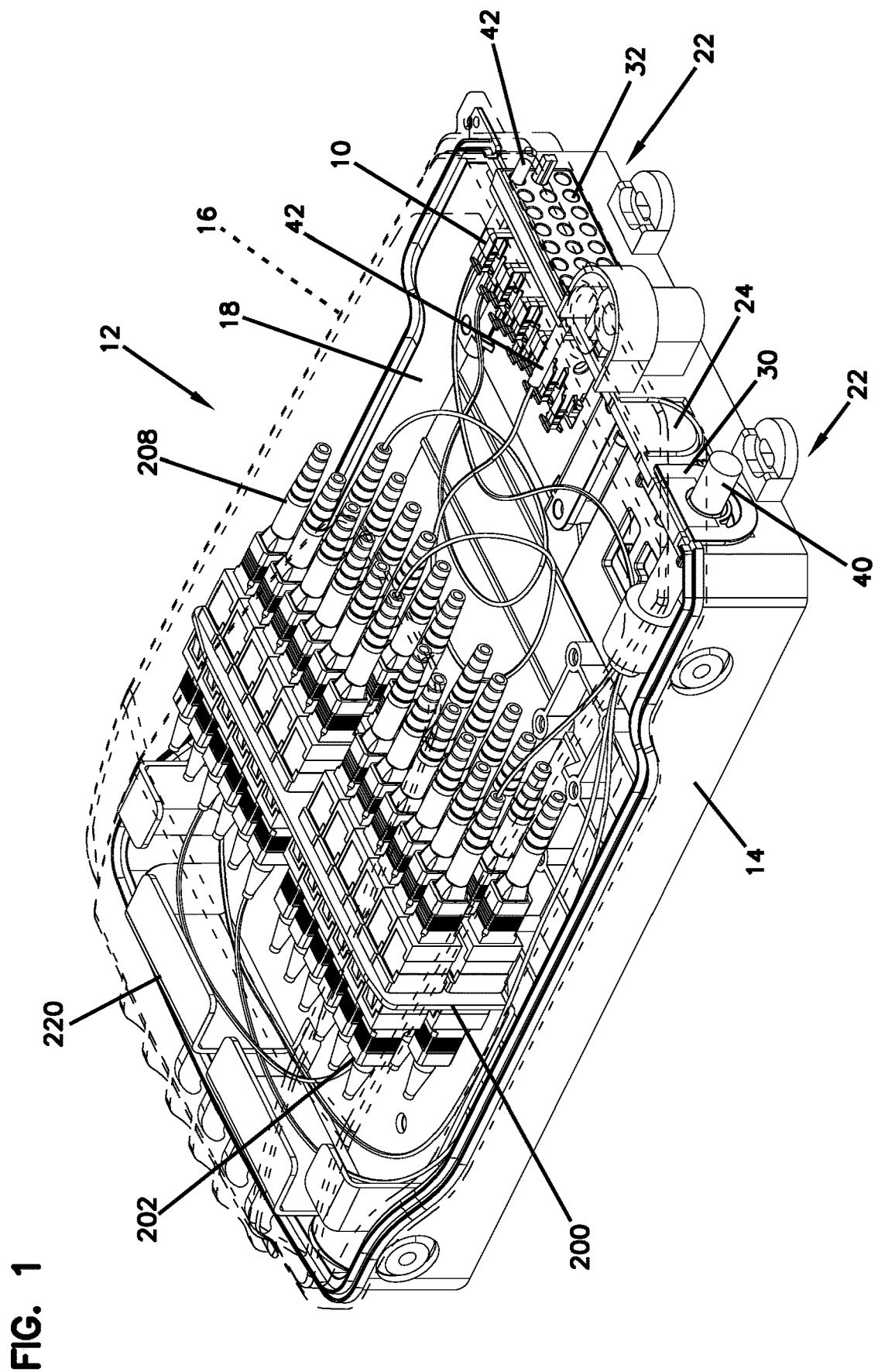
FIG. 1 is a perspective view of a telecommunications enclosure that includes a plurality of cable fixation devices, and shown without the enclosure cover, and including some example cables.
Figure 2:
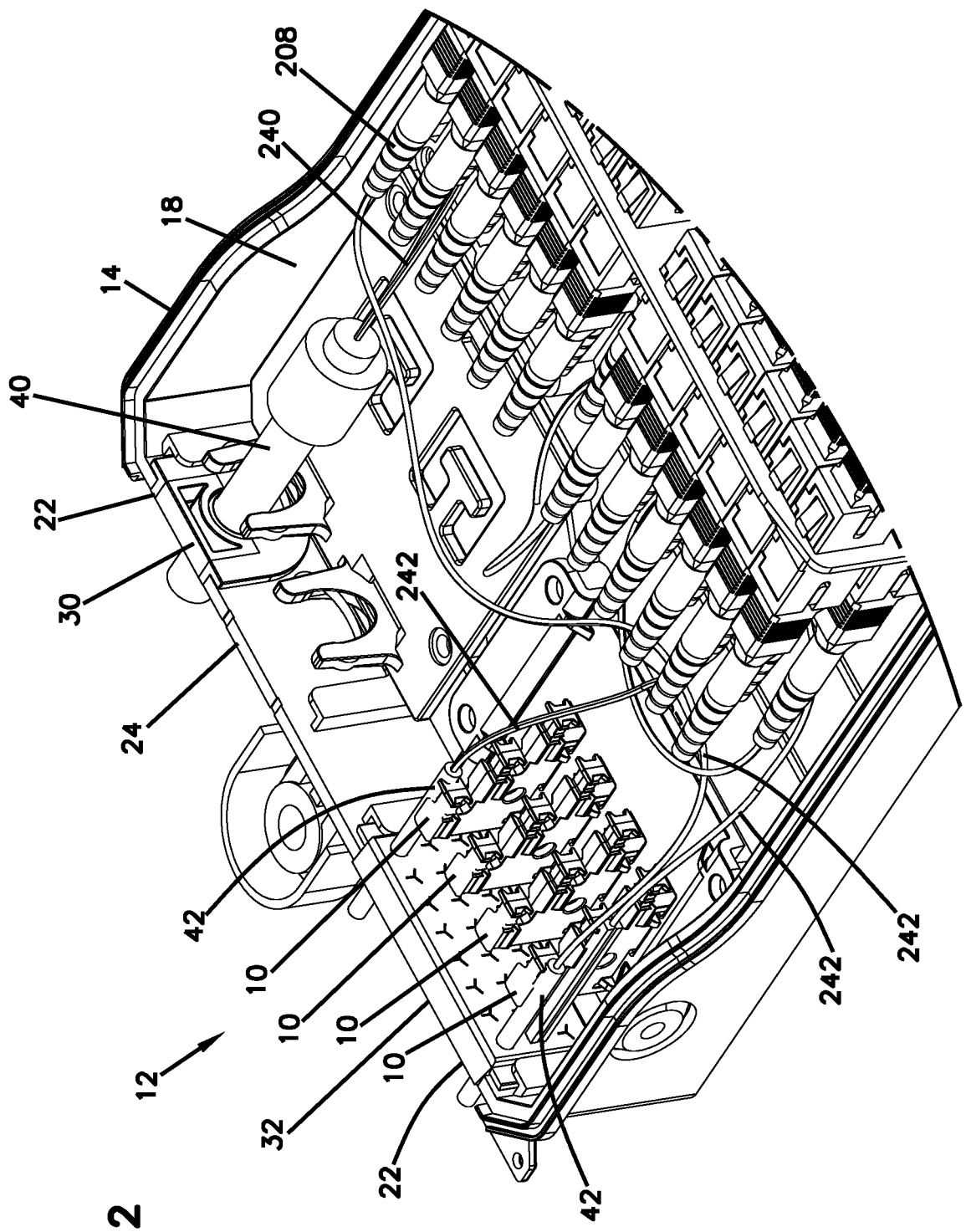
FIG. 2 is an enlarged perspective view of a cable entry and exit area of the telecommunications enclosure, with some example cables shown fixed to the enclosure.
Figure 3:
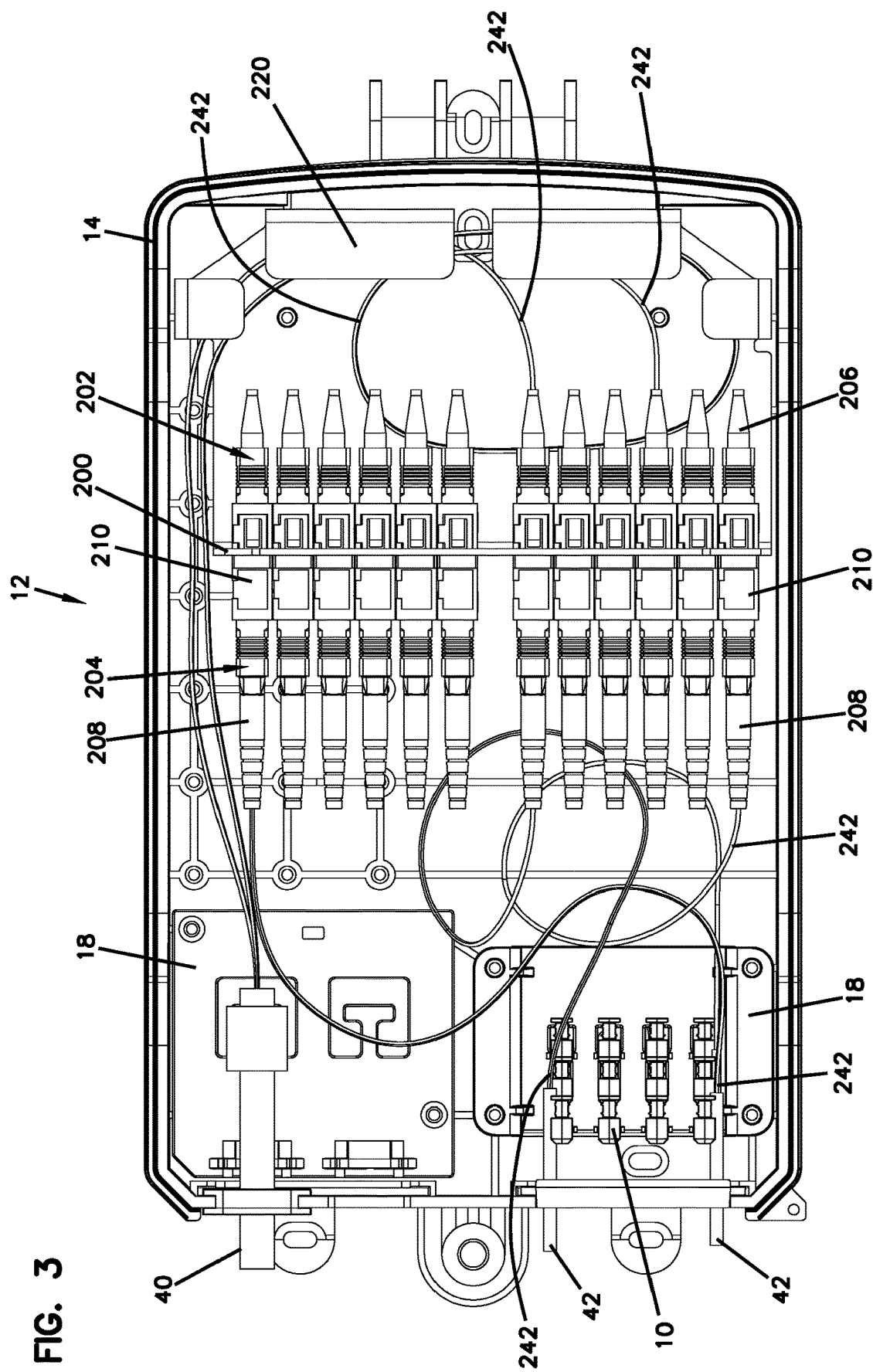
FIG. 3 is a top view of the telecommunications enclosure of FIGS. 1 and 2.
Figure 4:
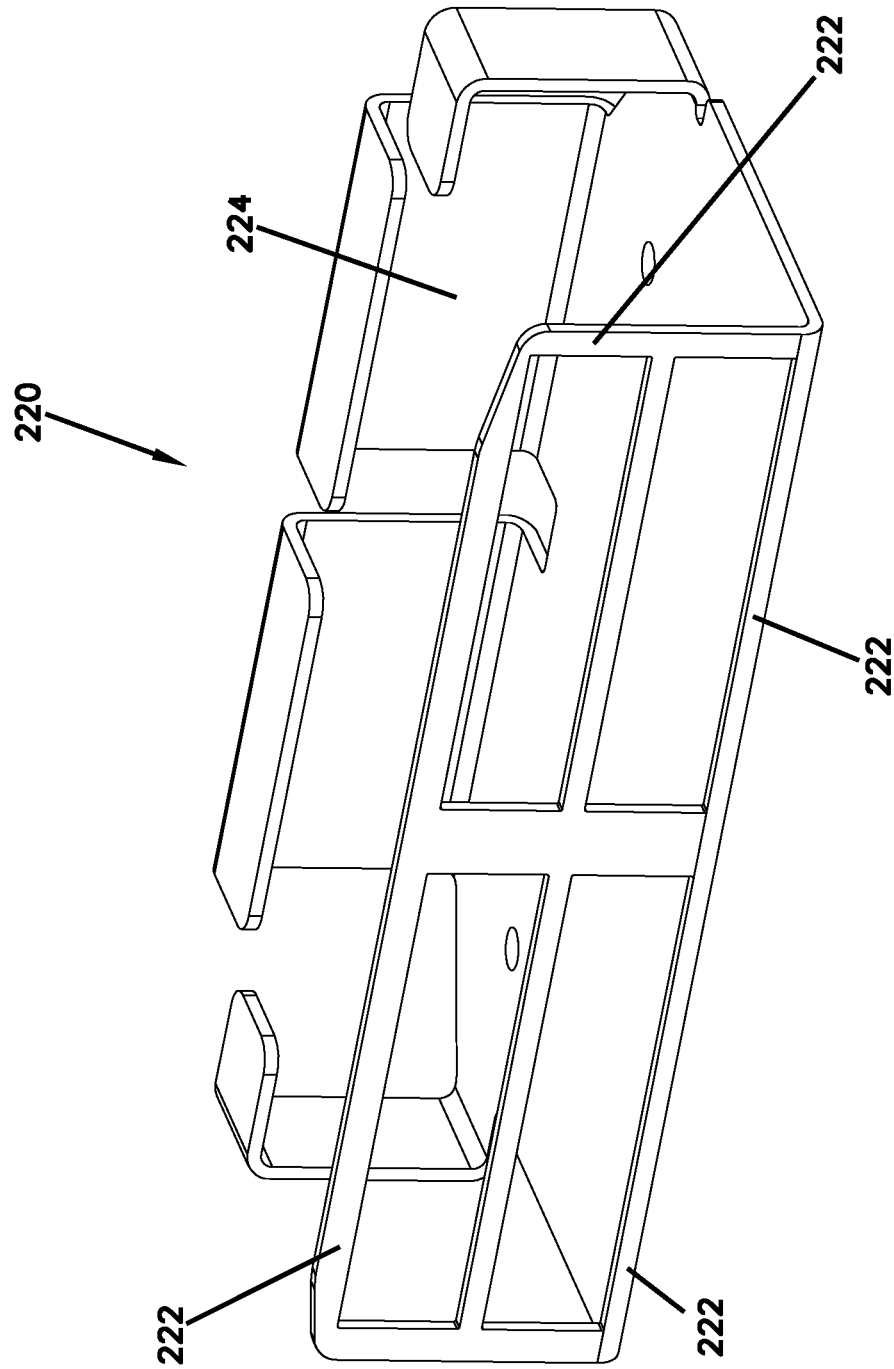
FIG. 4 is a perspective view of one embodiment of a termination holder of the telecommunications enclosure of FIGS. 1-3.
Figure 5:
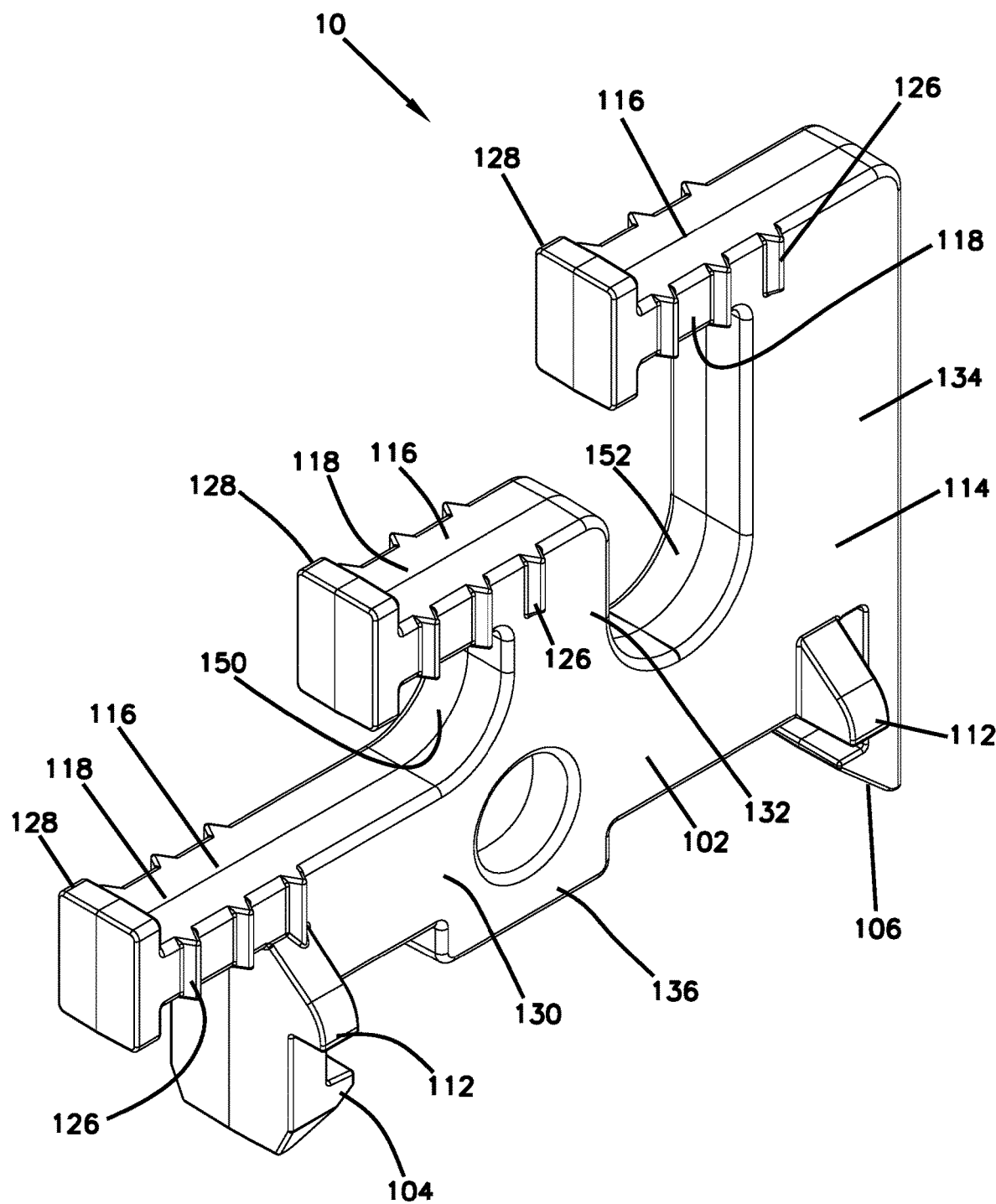
FIG. 5 is a first top perspective view of one embodiment of a cable fixation device.
Figure 6:
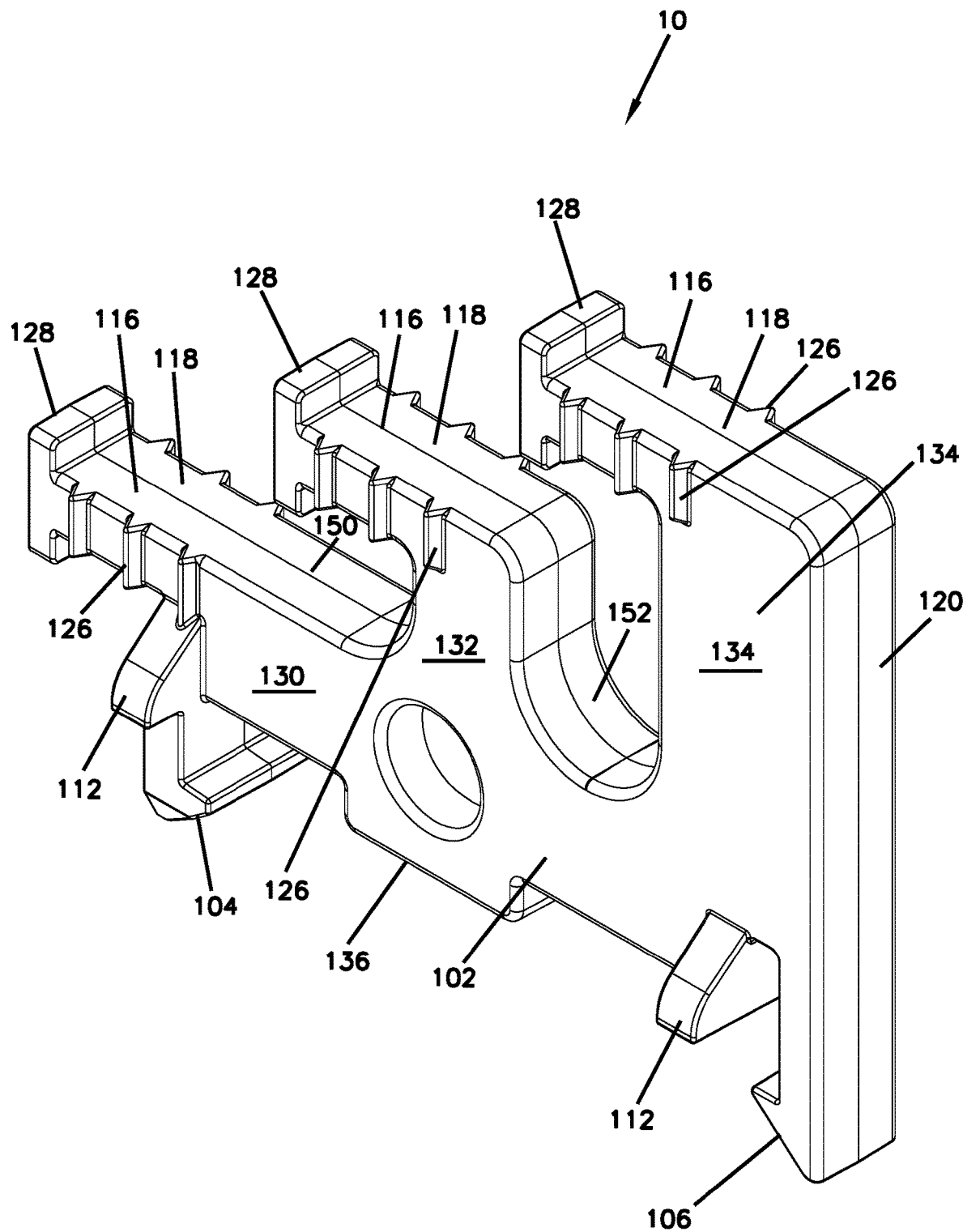
FIG. 6 is a further top perspective view of the cable fixation device of FIG. 5.
Figure 7:
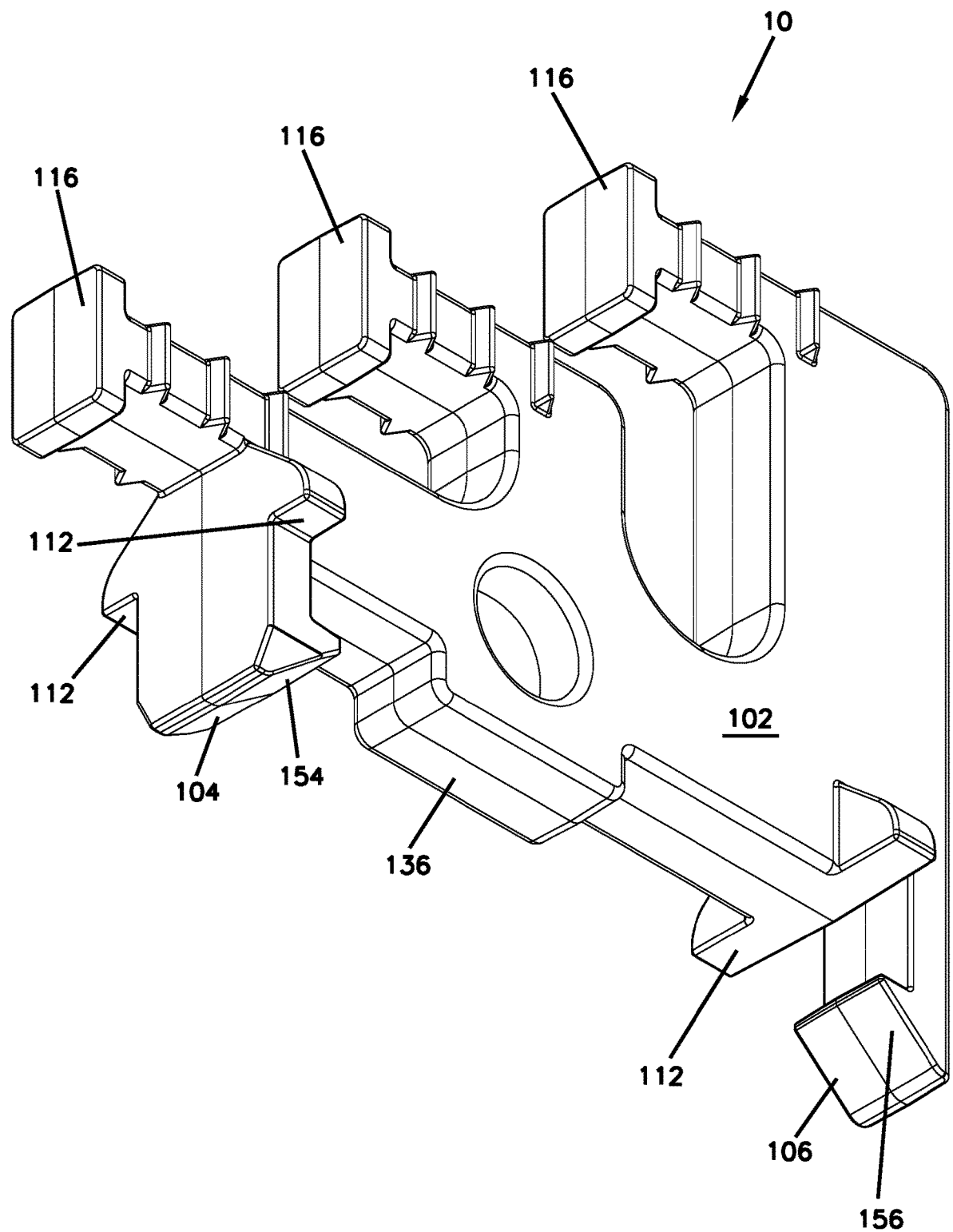
FIG. 7 is a first bottom perspective view of the cable fixation device of FIG. 5.
Figure 8:
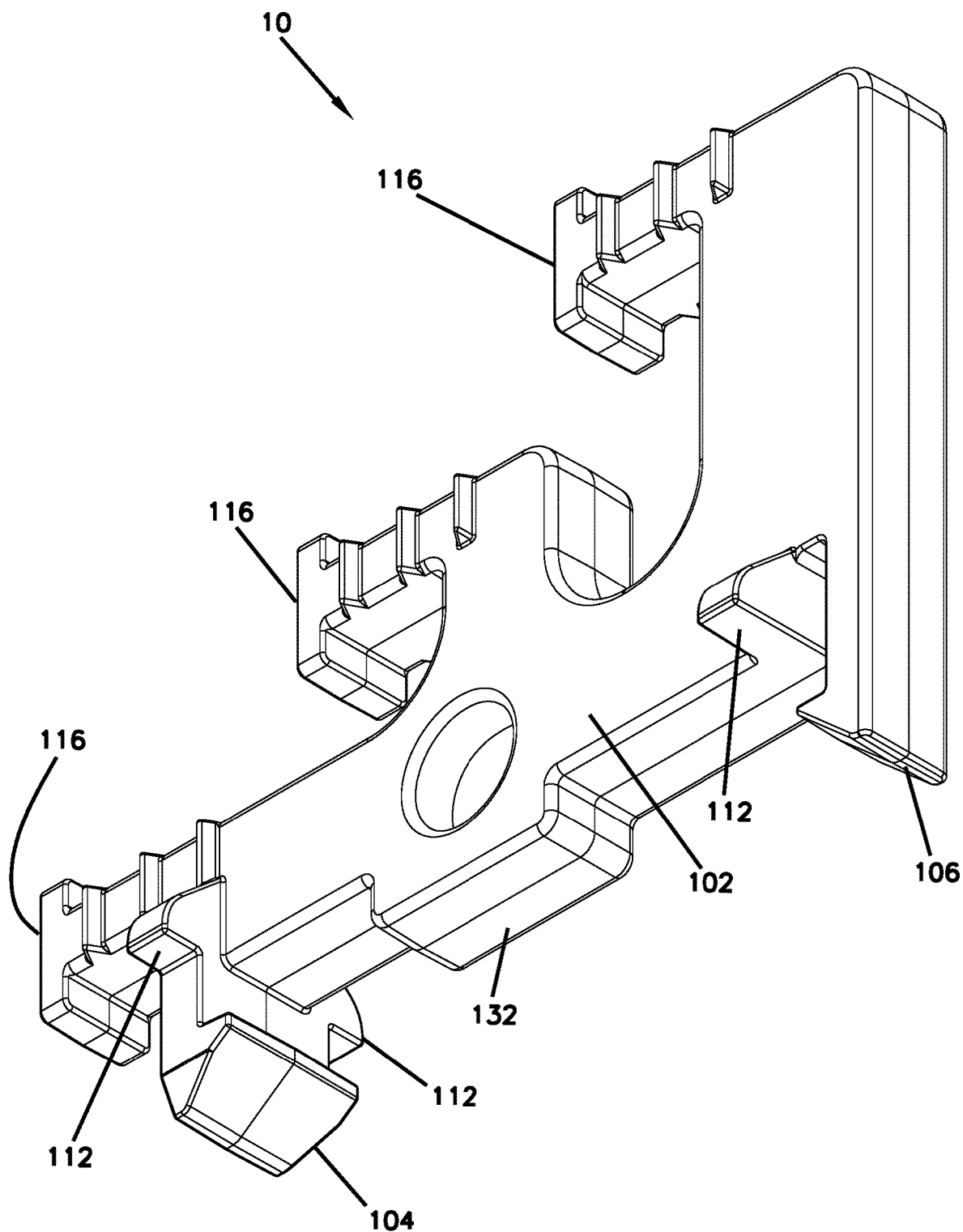
FIG. 8 is a further bottom perspective view of the cable fixation device of FIG. 5.
Figure 9:
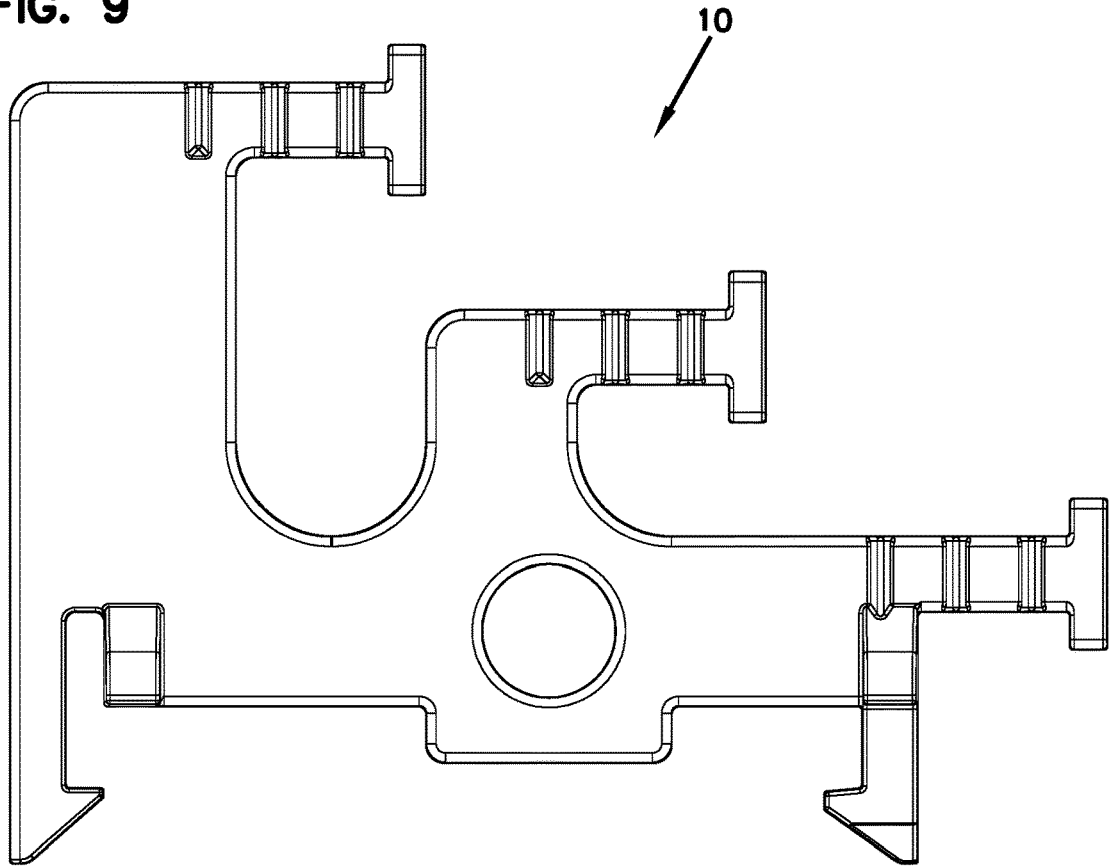
FIG. 9 is a side elevational view of the cable fixation device of FIG. 5.
Figure 10:
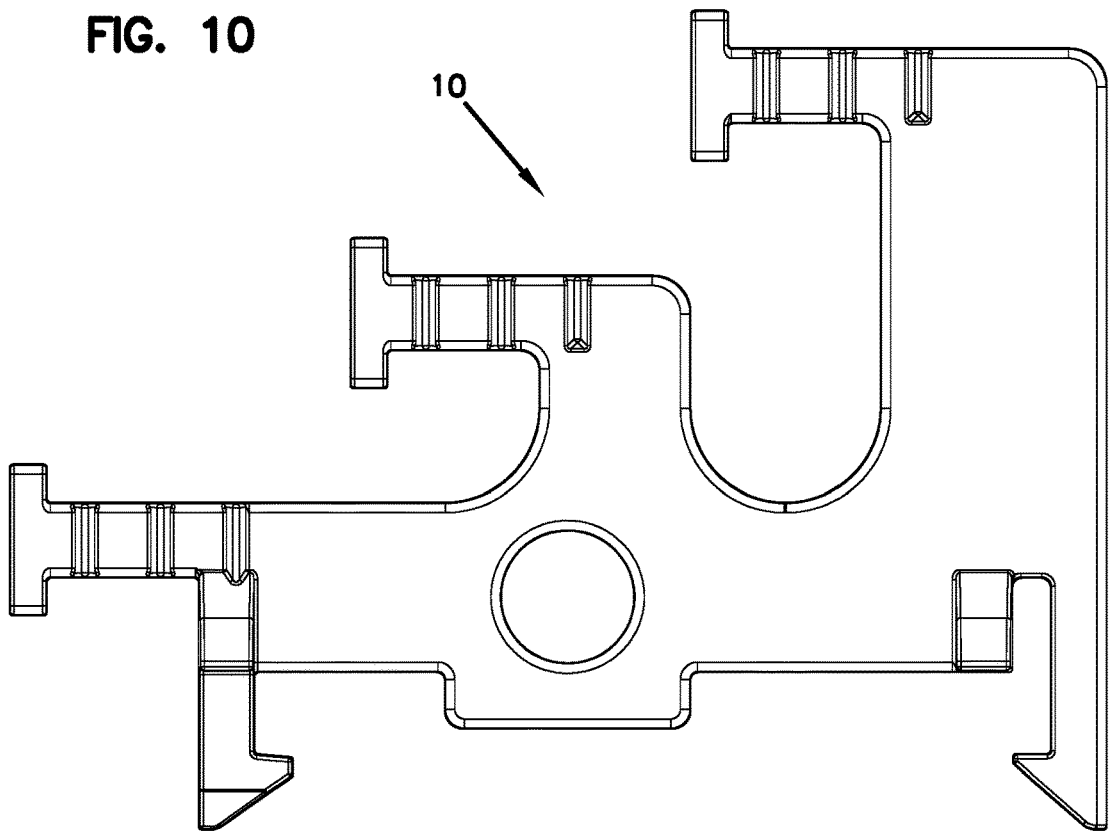
FIG. 10 is an opposite side elevational view of the cable fixation device of FIG. 5.
Figure 11:
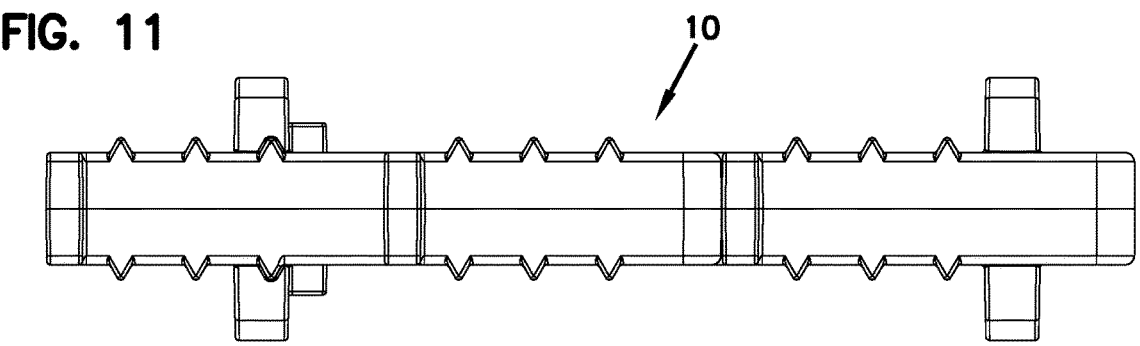
FIG. 11 is a top view of the cable fixation device of FIG. 5.
Figure 12:
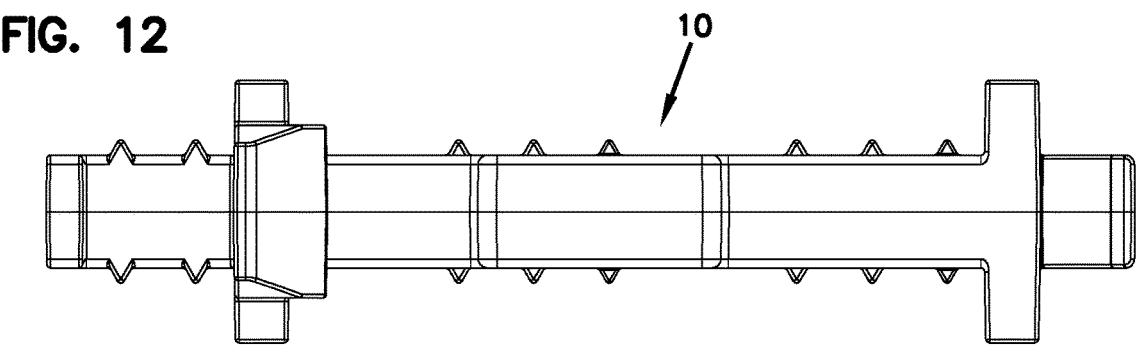
FIG. 12 is a bottom view of the cable fixation device of FIG. 5.
Figure 13:
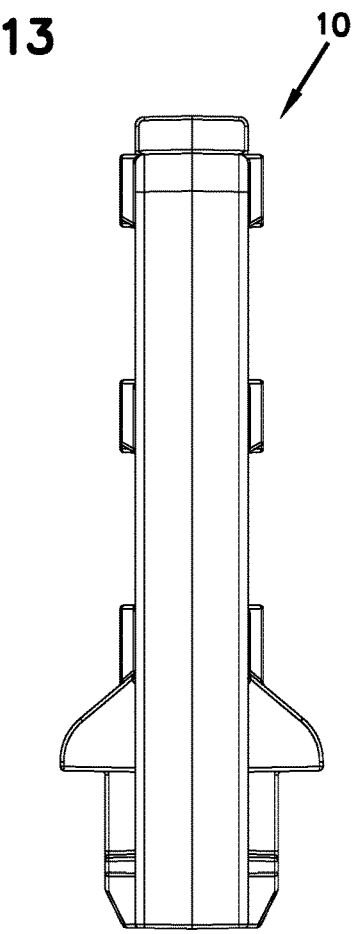
FIG. 13 is a first elevational end view of the cable fixation device of FIG. 5.
Figure 14:
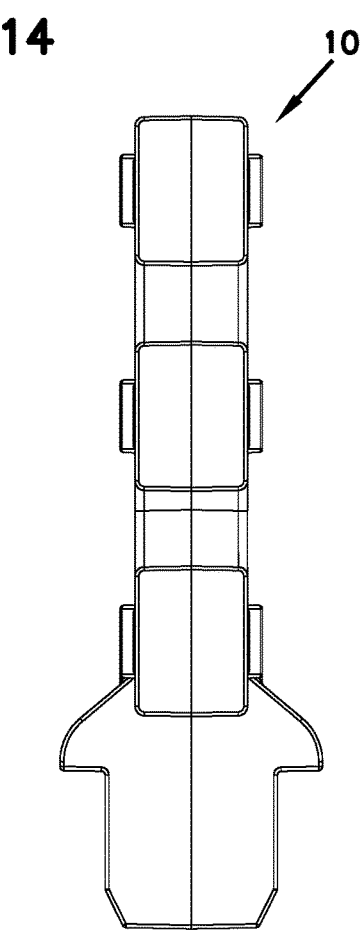
FIG. 14 is an opposite side elevational view of the cable fixation device of FIG. 5.
Figure 15:
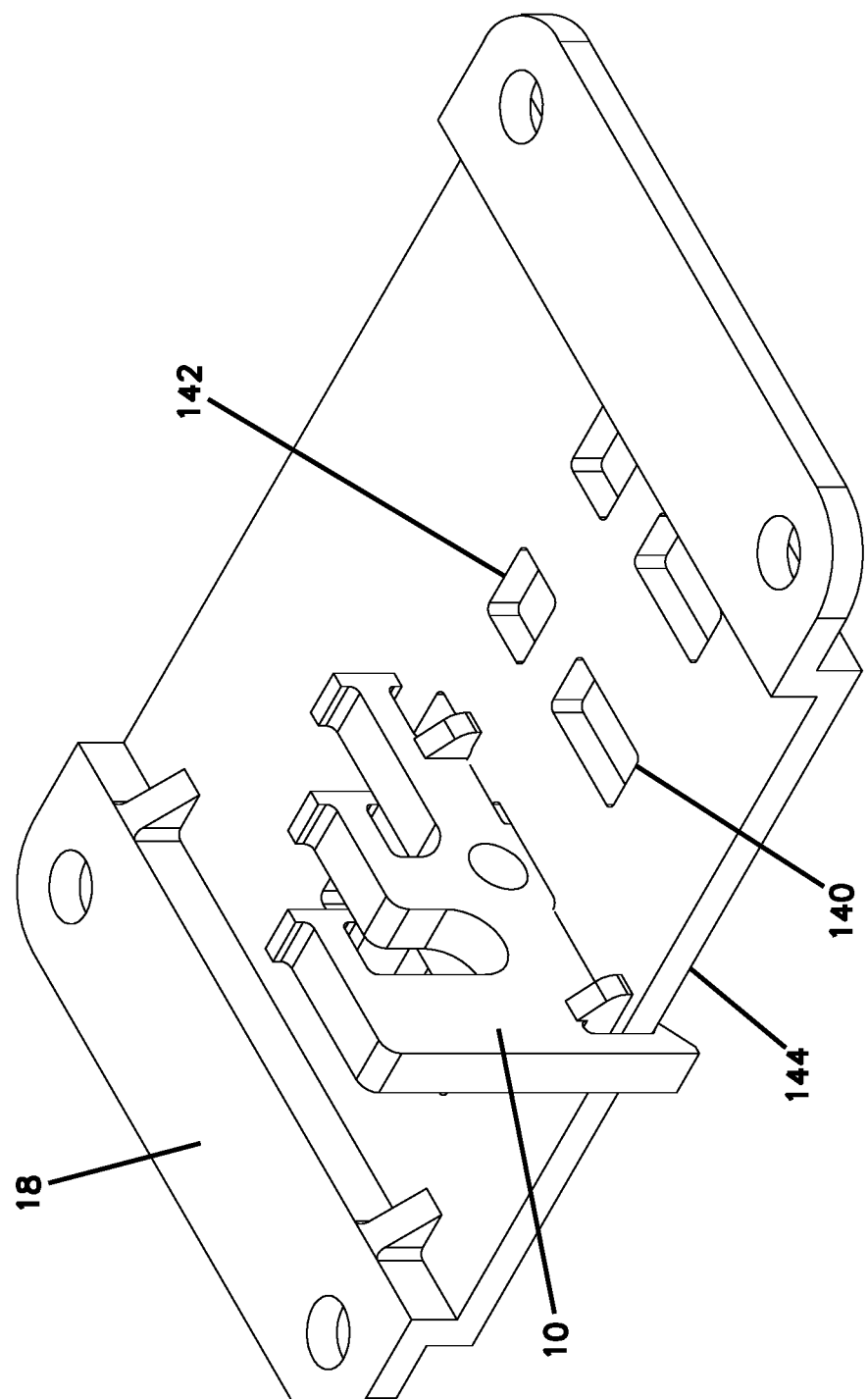
FIG. 15 shows an example base plate and an example cable fixation device mounted to the base plate.
Figure 16:
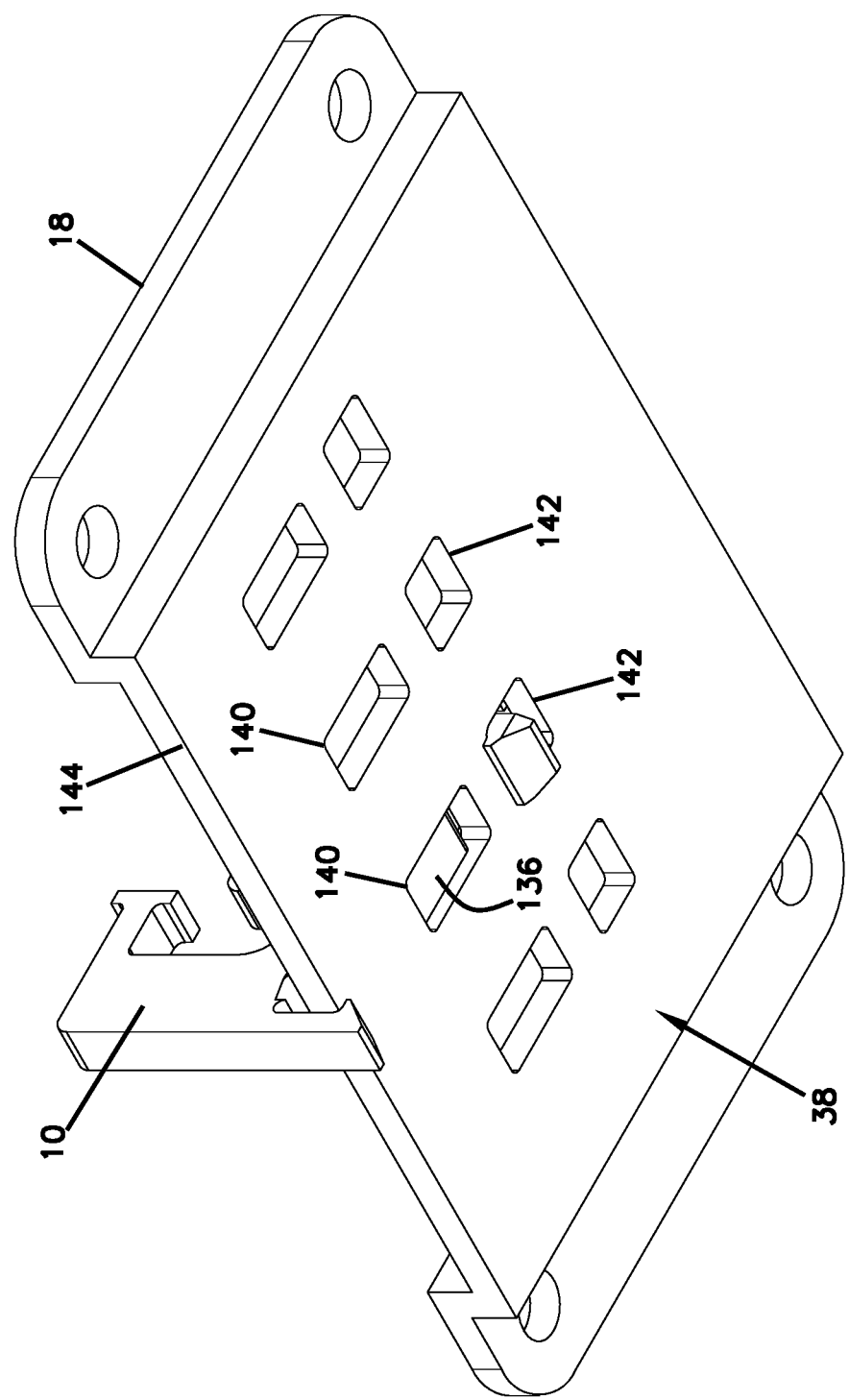
FIG. 16 is a further perspective view showing the base plate and cable fixation device mounted together.
Figure 17:
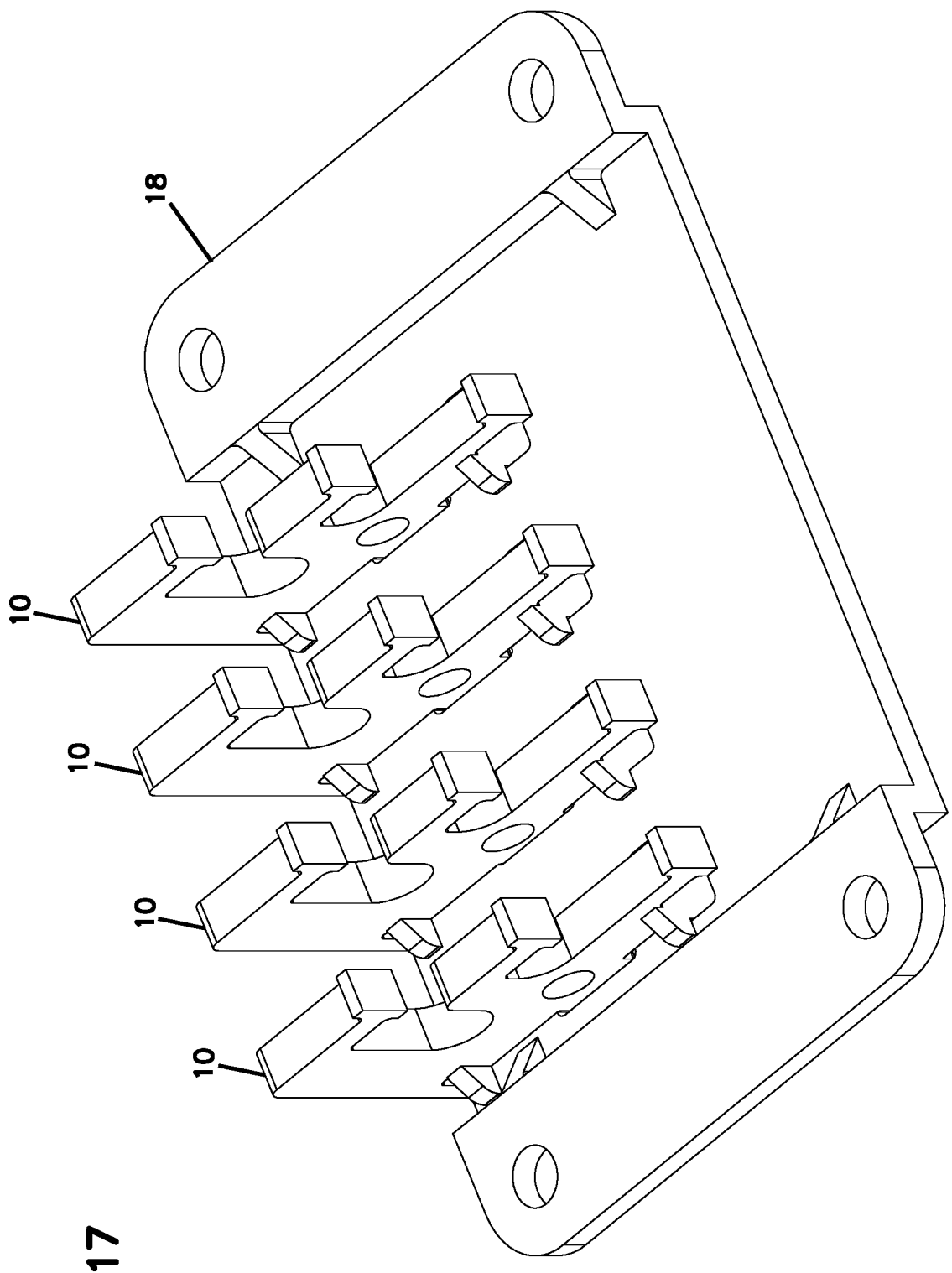
FIG. 17 shows the base plate of FIGS. 15 and 16 with four cable fixation devices mounted to the base plate.
Figure 18:
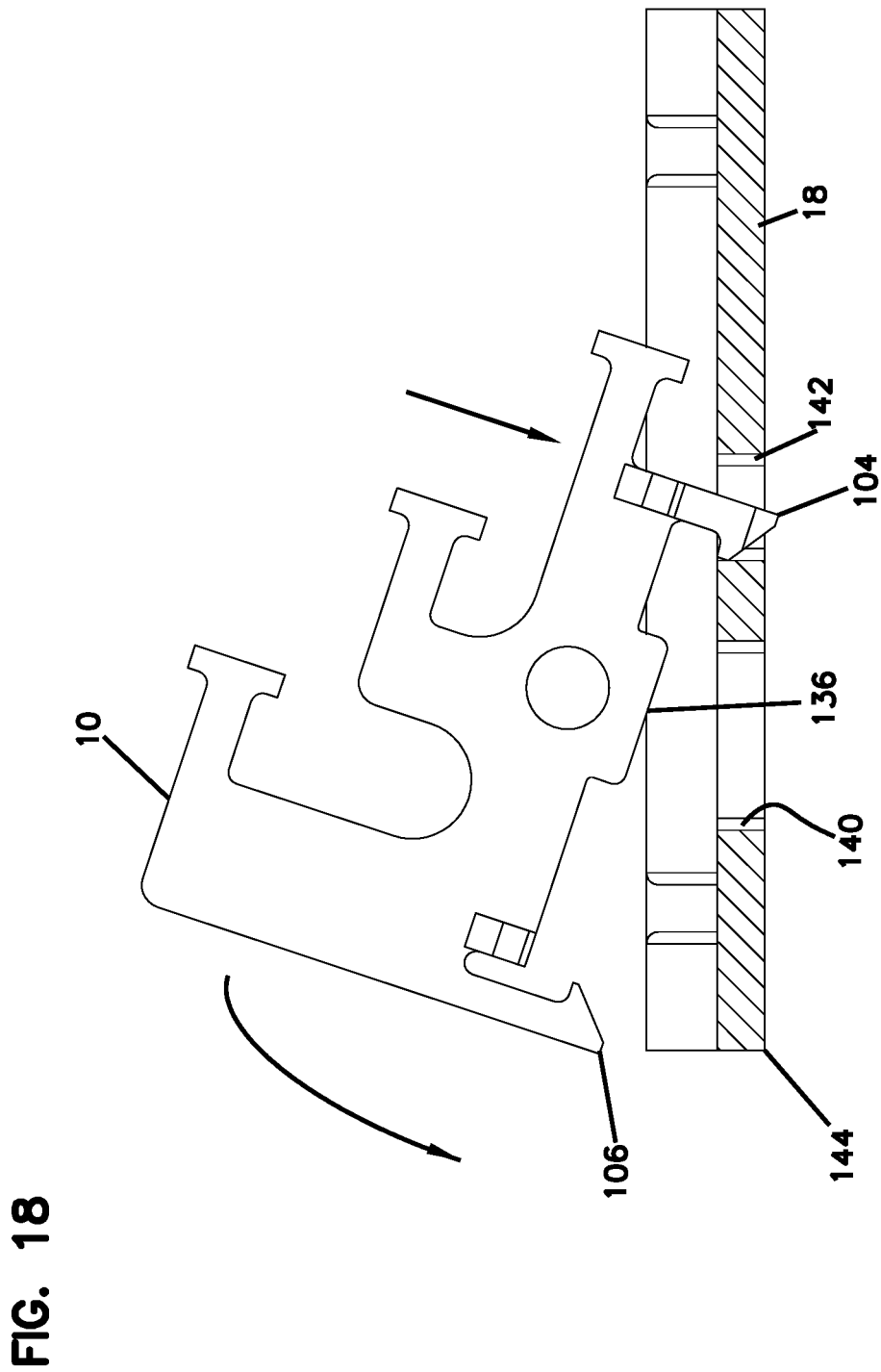
FIGS. 18-21 show the various steps for mounting the cable fixation device to the base plate.
Figure 19:
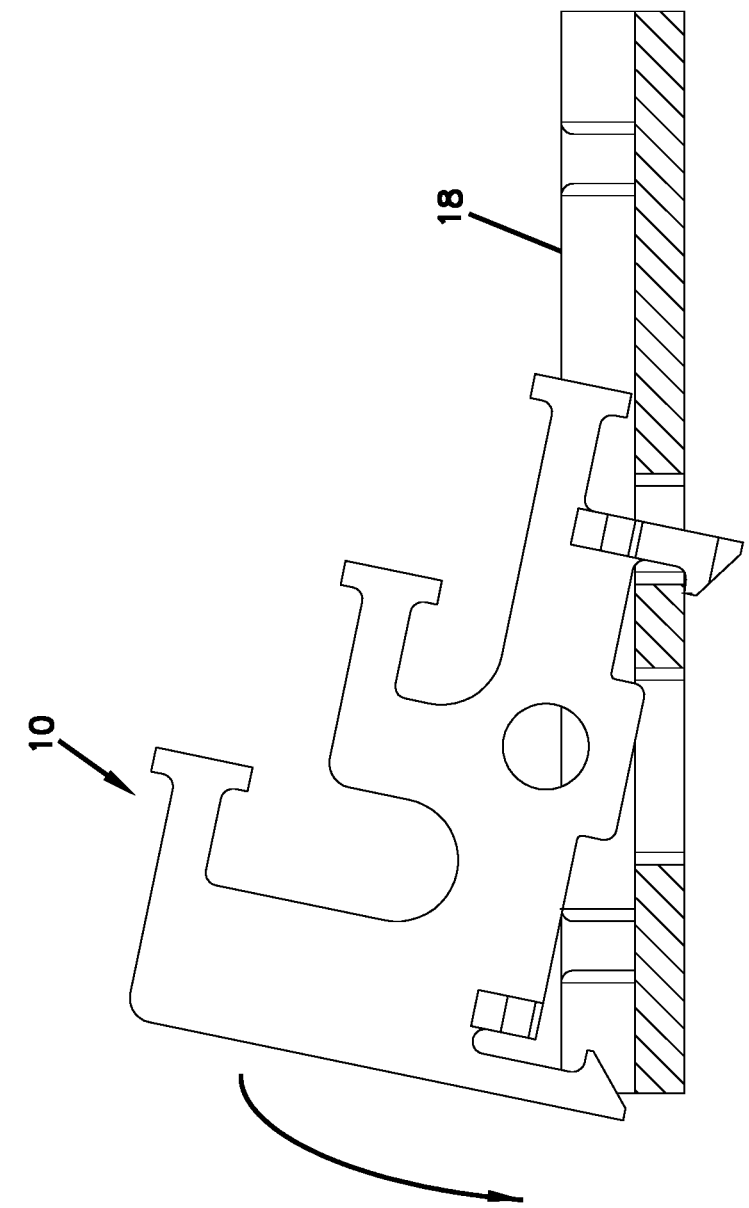
Figure 20:
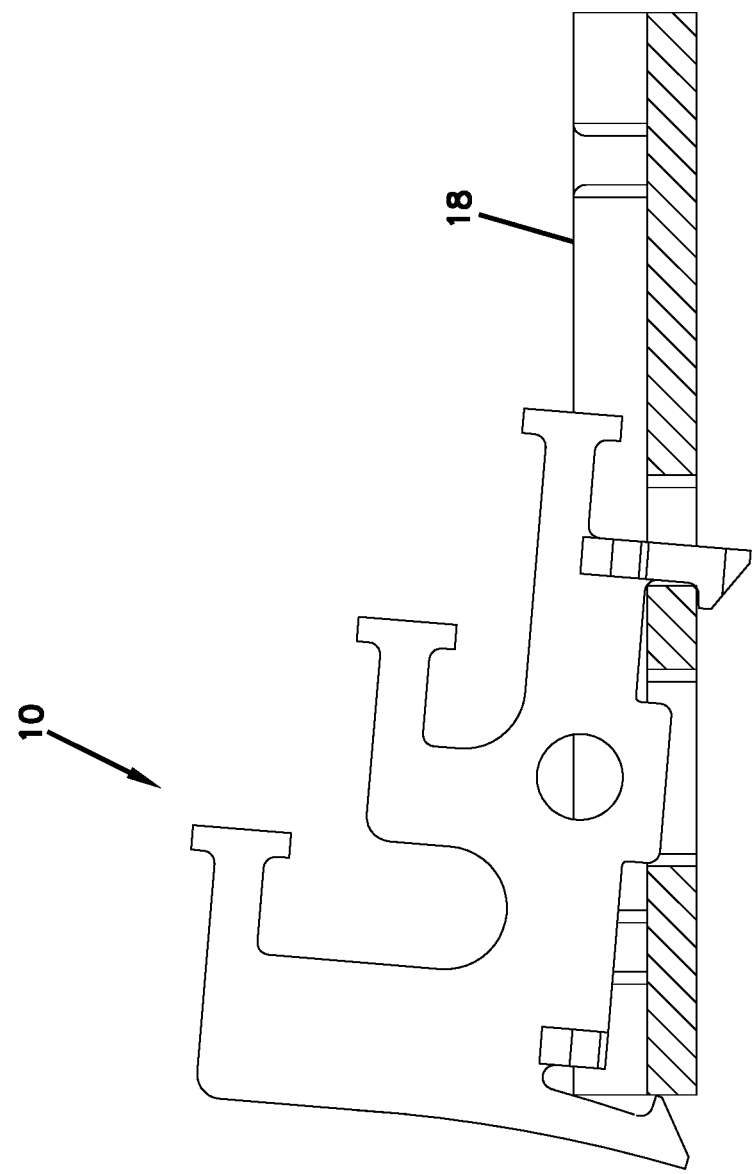
Figure 21:
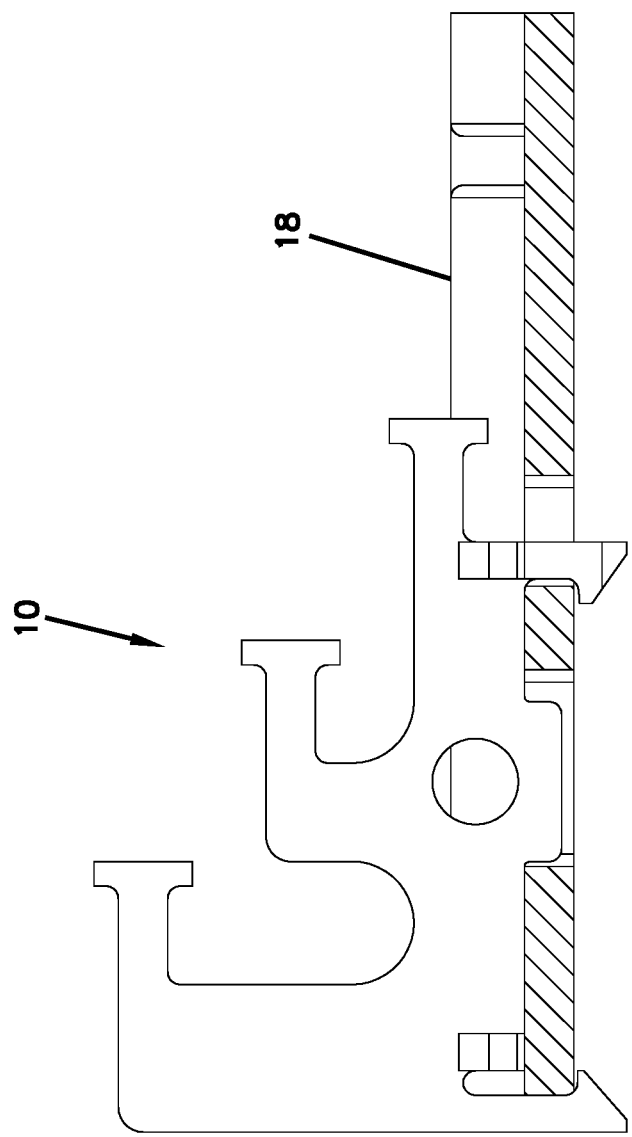
Figure 22:
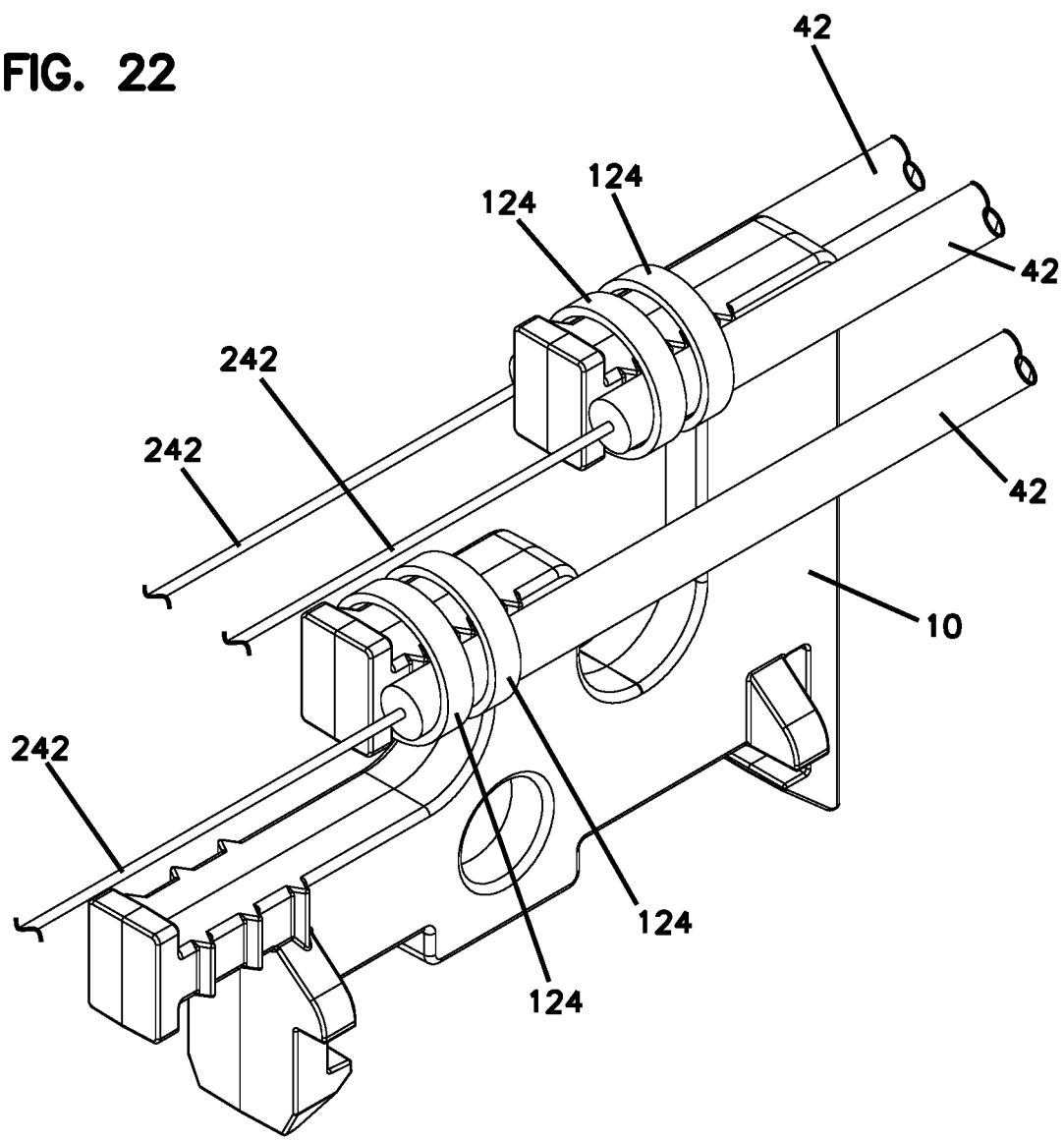
FIG. 22 shows the fixation device mounted to several cables in one example.

Referring now to FIGS. 1-3, enclosure 12 includes a base member 14, a cover 16, and an interior 18 for receiving telecommunications cables, connections, splices, splitters, and/or other equipment.

Cables 20 enter enclosure 12 through one or more cable ports 22. Not all of cable ports 22 need be used in every application. In the illustrated example, not all of the cable ports 22 are used. Cable ports 22 can be covered by a panel 24 which is removed when cables are used with enclosure 12. The panel can be a breakaway design. Cable seals 30, 32 are used to seal the individual cables entering at each cable port 22 from the environment, such as from dust or water. Cable seals 30, 32 vary for different sized cables. As shown, different cables 40, 42 are used with different cable seals 30, 32.

Each cable fixation device 10 is mounted to base member 14 of enclosure 12 with a snap arrangement 38.

Referring to FIGS. 5-22, cable fixation device 10 includes a body 102 with first snap 104 and second snap 106. First snap 104 and second snap 106 both extend from base 110. The body 102 also includes at least one and preferably two stabilizing feet 112. Body 102 of cable fixation device 10 also includes an upright 114 extending from base 110 and including one or more fixation projections 116, each fixation projection 116 for securing one or more cables. In the illustrated example, each cable fixation device 10 includes three fixation projections 116. Each fixation projection 116 is capable of receiving one or two cables as desired. More cables could be added, such as three or four if desired. A cable can be attached to each fixation projection 116 with a cable tie 124, such as a zip tie. Each fixation projection 116 can include ribs 126 to assist with cable fixation. Ribs 126 are optional (see FIGS. 15-21). Each fixation projection 116 also includes an end flange 128 to retain the cable tie 124 in position. Base areas 130, 132, 134, keep the tie from moving in an opposite direction. Each fixation projection 116 extends parallel to one another away from the opposite side 120 of cable fixation device 10. Cut-outs 150, 152 provide spacing and access to each projection 116.

Cable fixation device 10 can be mounted to cables before being attached to base member 14/base plate 18. Alternatively, or in addition to, cables can be attached to cable fixation device 10 after connection to base member 14/base plate 18. It should be appreciated that any number of fixation projections 116 can be provided on cable fixation device 10 including one, two, three, four, five, and more. Ramps 154, 156 on first snap 104 and second snap 106, respectively can be provided to assist with installation of cable fixation device 10 on base plate 18. Second snap 106 is also flexibly moveable. Once mounted to base plate 18, each cable fixation device 10 can be removed for cable access, cable installation or for replacement.

As shown, base member 14 of enclosure 12 includes a base plate 18. Base plate 18 mounts to base member 14 with fasteners in the example shown. Base plate 18 receives one or more cable fixation devices 10. Body 102 of cable fixation device 10 also includes a lower projection 136 which is received in a corresponding first opening 140 in base plate 18. As shown, first snap 104 of cable fixation device 10 is received in a second opening 142 in base plate 18. Second snap 106 is affixed to an edge 144 of base plate 18.

The cable fixation devices 10 can be used as desired depending on the situation for cable fixation and the enclosure 12.

Different cables can be accommodated with the various parts, such as cables with strength members and cables without.

A kit can provided with the various parts to be used with a variety of cable sizes and locations, without requiring custom made brackets specific to a certain cable size or cable location. For example, the size of the fixation projections 116 can be changed for different cable sizes. Also, the kit could include a variety of cable fixation devices 10 with different numbers of fixation projections 116.

In the example arrangement of FIGS. 1-3, a feeder cable (cable 40) enters enclosure 12, and provides fiber optic signal connectivity at a rear 202 of termination filed 200. Drop or distribution cables (cables 42) provide fiber optic signal connectivity at a front 204 of termination filed 200. As shown, cables 40, 42 are preconnectorized with connectors 206, 208. Termination field 200 includes mating adapters 210. A termination holder 220 with openings 222 holds adapters 210, and also provides a slack storage area 224, such as for the feeder cables. Cable 40 is a multi-fiber cable, and cable 42 is a single fiber cable in the illustrated example. Cables 40, 42 include outer jackets and inner fibers. The inner fibers 240, 242 are routed within the interior of enclosure 12. Splicing and/splitting can also be used in enclosure 12 is the system if desired instead of or in addition to the The above specification, examples and data provide a complete description of the manufacture and use of the composition of the invention. Since many embodiments of the invention can be made without departing from the spirit and scope of the invention, the invention resides in the claims hereinafter appended.

NUMBER PART NAMES 10 cable fixation device
12 enclosure
14 base member 16 cover
18 base plate
20 cables
22 cable port
24 panel
30 cable seals
32 cable seals
38 snap arrangement
40 cable
42 cable
102 body
104 first snap
106 second snap
110 base
112 two stabilizing feet
114 upright
116 fixation projection
118 reduced dimensional portion
124 cable tie
126 ribs
128 end flange
130 base area
132 base area
134 base area
136 lower projection
140 first opening
142 second opening
144 edge
150 cut-out
152 cut-out
154 ramp
156 ramp
200 termination field
206 connectors
208 connectors
210 adapters
220 termination holder
222 openings
224 slack storage area
240 inner fibers
242 inner fibers

What is claimed is:

1. A cable fixation device comprising:
a body with a snap arrangement; and
an upright projecting from the body, the upright of the body including a plurality of fixation projections that extend parallel in a staggered arrangement to one another in the same direction from a vertical axis of the upright, the plurality of fixation projections having a reduced dimensional portion for receiving a cable and a cable tie, wherein the plurality of fixation projections each have a plurality of ribs that extend externally on opposite sides of the plurality of fixation projections, and wherein the plurality of ribs extend along a length of each of the plurality of fixation projections for engaging a cable jacket or a cable wrap.

2. The cable fixation device of claim 1, wherein the body includes at least one snap.

3. The cable fixation device of claim 2, wherein the body includes two snaps as part of the snap arrangement.

4. The cable fixation device of claim 2, wherein the at least one snap includes a ramp.

5. The cable fixation device of claim 1, wherein the body, the upright, and the plurality of fixation projections are made from plastic.

6. The cable fixation device of claim 1, wherein the snap arrangement mounts to an edge of a holder.

7. The cable fixation device of claim 6, wherein the body includes projecting feet for supporting the body on the holder.

8. The cable fixation device of claim 1, wherein the body includes a lower projection for receipt in a corresponding opening on a holder.

9. The cable fixation device of claim 1, wherein the plurality of fixation projections are capable of receiving a cable on each of two opposite sides of each fixation projection.

10. The cable fixation device of claim 1, wherein each fixation projection is separated from an adjacent fixation projection by a cut-out.

11. The cable fixation device of claim 1, further comprising a plurality of cable fixation devices mounted parallel to one another to a holder.

12. The cable fixation device of claim 1, wherein the plurality of fixation projections project away from an opposite side of the cable fixation device.

13. The cable fixation device of claim 1, further comprising a lower projection that extends from the body in a direction perpendicular to the plurality of fixation projections.

* * * * *

UNITED STATES PATENT AND TRADEMARK OFFICE
CERTIFICATE OF CORRECTION

PATENT NO. : 11,194,112 B2
APPLICATION NO. : 16/067521
DATED : December 7, 2021
INVENTOR(S) : Collart et al.

Page 1 of 1

It is certified that error appears in the above-identified patent and that said Letters Patent is hereby corrected as shown below:

In the Specification

Column 1, Lines 7-10: "This application claims the benefit of U.S. Patent Application Ser. No. 62/273,867, filed on Dec. 31, 2015, the disclosure of which is incorporated herein by reference in its entirety." should read --This application is a National Stage Application of PCT/EP2016/082899, filed on Dec. 29, 2016, which claims the benefit of U.S. Patent Application Serial No. 62/273,867, filed on Dec. 31, 2015, the disclosures of which are incorporated herein by reference in their entireties. To the extent appropriate, a claim of priority is made to each of the above disclosed applications.--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*